WILLIAM MORAN.
Baking-Pan.
No. 128,238. Patented June 25, 1872.
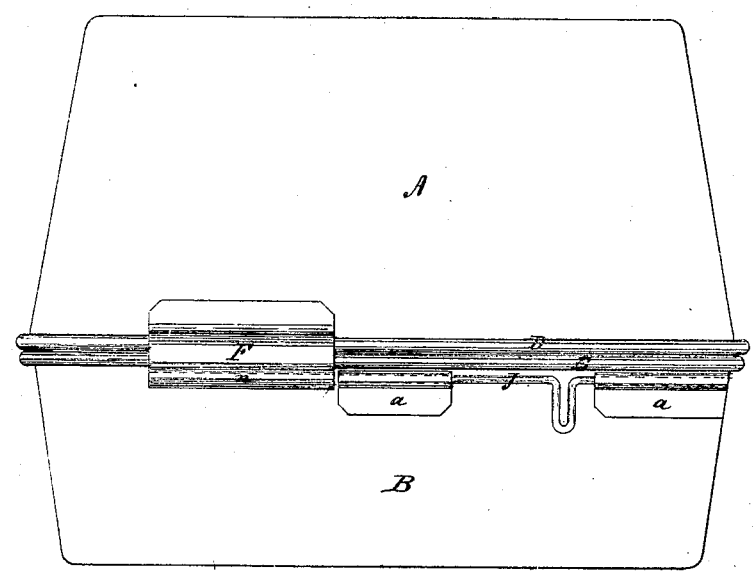
Fig. I.
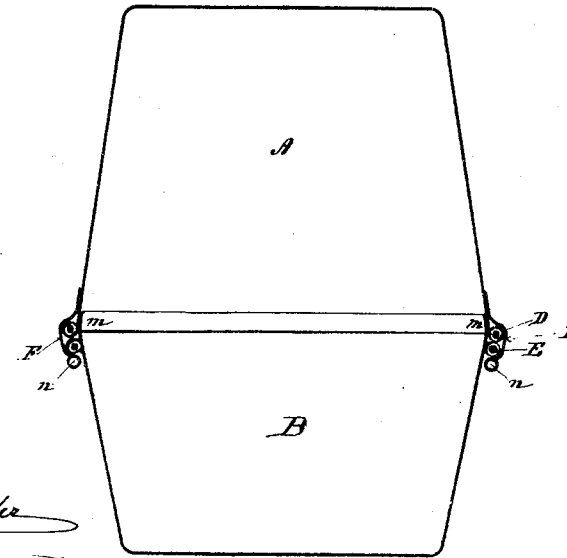
Fig. II.
Witnesses. Inventor.

UNITED STATES PATENT OFFICE.

WILLIAM MORAN, OF JERSEY CITY, NEW JERSEY.

IMPROVEMENT IN BAKING-PANS.

Specification forming part of Letters Patent No. 128,238, dated June 25, 1872.

*To all whom it may concern:*

Be it known that I, WILLIAM MORAN, of Jersey City, in the State of New Jersey, have invented a new and useful Improvement in Baking-Pans, of which the following is a specification:

The nature of my invention consists in the construction of a baking-pan, which shall be perfectly air-tight, and which shall be more readily and conveniently taken off and replaced in the process of cooking than is the case with others at present manufactured.

Figure I represents an outside side view of my improved baking-pan embodying my invention. Fig. II is a cross-section of the same.

The baking-pan consists of two parts, the bottom part B and the top part A. The top part A is wired at the bottom, as shown at D, forming a flanch, which rests upon the wired part E on the bottom part B. This wired part E on the bottom part B is placed a short distance below the top of said part B, so as to leave a projecting flanch, m, all around the top, over which the top pan A fits tight. (See Fig. II.) The natural flexibility of the metal gives sufficient spring to this flanch m, by having the sides thereof disjoined at the corners so as to spring freely to insure a perfectly-tight fit when the top pan is placed upon it. This pan is, therefore, made perfectly air-tight by this construction of the flanch m on the lower part B of the pan, whereby all the flavor and nutritive properties of the meat and poultry and all its substances are retained, which advantages are not obtained by any other baking-pan. To the top part A long lugs F are fastened at the sides, projecting downward and bent slightly inward, so that, when the top pan A is placed upon the bottom pan B, these lugs F must be sprung open to pass over the wired part E on the bottom pan B, and then spring back to encircle partly said wired part E, holding thereby the two pans firmly together. The lower ends of these lugs F are provided with a small tube or circular opening, n, into which a bolt, J, sliding in the lugs a a fastened to the bottom pan B, is made to pass, for the purpose of fastening the two pans together.

In consequence of the exclusion of all the air from a pan constructed as above specified, this pan is unrivaled for the baking of bread or cake, on account of the uniformity of the heat secured. The loaf is thereby baked regularly through, and is rendered systematically porous and light, all the nutritive properties are retained, and the flavor much improved.

A circular or other suitable ventilator may be placed at the end or top of the upper pan, in the usual manner, to allow the carbonic acid and other gases readily to escape during the first stages of baking bread.

What I claim as my invention, and desire to secure by Letters Patent, is—

A baking-pan composed of two parts, A B, having on one part an elastic flanch, m, freely flexible throughout its length, over which the other part fits, and is held by spring lugs F F or equivalent fastening device, substantially as and for the purpose herein specified.

WILLIAM MORAN.

Witnesses:
HENRY E. ROEDER,
J. B. NONES.